United States Patent [19]
Hirose et al.

[11] Patent Number: 4,839,846
[45] Date of Patent: Jun. 13, 1989

[54] APPARATUS FOR PERFORMING FLOATING POINT ARITHMETIC OPERATIONS AND ROUNDING THE RESULT THEREOF

[75] Inventors: Kenji Hirose, Hitachi; Tadaaki Bandoh, Ibaraki; Hidekazu Matsumoto; Shinichiro Yamaguchi, both of Hitachi; Hirokazu Hirayama, Hitachi; Hiroaki Nakanishi, Hitachi, all of Japan

[73] Assignees: Hitachi, Ltd.; Hitachi Engineering Co., Ltd., both of Tokyo, Japan

[21] Appl. No.: 838,941

[22] Filed: Mar. 12, 1986

[30] Foreign Application Priority Data

Mar. 18, 1985 [JP] Japan ................................. 60-53975

[51] Int. Cl.⁴ .............................................. G06F 7/38
[52] U.S. Cl. ..................................................... 364/748
[58] Field of Search ........................................ 364/748

[56] References Cited

U.S. PATENT DOCUMENTS

| 4,130,879 | 12/1978 | Cushing | 364/748 |
| 4,338,675 | 7/1982 | Palmer et al. | 364/748 |
| 4,442,498 | 4/1984 | Rosen | 364/748 |
| 4,468,748 | 8/1984 | Blaw et al. | 364/748 |
| 4,476,523 | 10/1984 | Beauchamp | 364/748 |
| 4,484,259 | 11/1984 | Palmer et al. | 364/748 |
| 4,562,553 | 12/1985 | Mattedi et al. | 364/748 |
| 4,644,490 | 2/1987 | Kobayashi | 364/748 |

OTHER PUBLICATIONS

"A Proposed Standard for Binary Floating Point Arithmetic", IEEE Computer, Mar. 1981, pp. 51–62.
Twaddell, "Higher Performance Marks Floating Point Chips", *Computer Designs*, pp. 24–30, Apr. 15, 1986.

*Primary Examiner*—Gary V. Harkcom
*Assistant Examiner*—Dale M. Shaw
*Attorney, Agent, or Firm*—Antonelli, Terry & Wands

[57] ABSTRACT

An operation unit capable of performing round processing at a high speed in a floating point operation. A circuit for detecting an overflow on the condition of a signal representing all 1's in an output of a mantissa shifter and a signal representing round-up, a carry look-ahead circuit and a circuit for generating a round precision signal are provided. When the overflow takes place, the mantissa is produced as "1". The operation unit is compatible to single, double and extended precisions recommended by Institute of Electrical and Electronic Engineers (IEEE).

10 Claims, 15 Drawing Sheets

FIG. 4a
RN (ROUND TO NEAREST EVEN) MODE

| SIGN BIT | LSB | GUARD BIT | ROUND BIT | STICKY BIT | ROUNDING |
|---|---|---|---|---|---|
| X | X | ϕ | X | X | ROUND-OFF |
| X | ϕ | 1 | ϕ | ϕ | ROUND-OFF |
| X | 1 | 1 | ϕ | ϕ | ROUND-UP |
| X | X | 1 | X | 1 | ROUND-UP |
| X | X | 1 | 1 | X | ROUND-UP |

FIG. 4b
RP (ROUND TOWARD PLUS INFINITY) MODE

| SIGN BIT | LSB | GUARD BIT | ROUND BIT | STICKY BIT | ROUNDING |
|---|---|---|---|---|---|
| 1 | X | X | X | X | ROUND-OFF |
| ϕ | X | ϕ | ϕ | ϕ | ROUND-OFF |
| ϕ | X | AT LEAST ONE BIT IS "1" | | | ROUND-UP |

FIG. 4c
RM (ROUND TOWARD MINUS INFINITY) MODE

| SIGN BIT | LSB | GUARD BIT | ROUND BIT | STICKY BIT | ROUNDING |
|---|---|---|---|---|---|
| ϕ | X | X | X | X | ROUND-OFF |
| 1 | X | ϕ | ϕ | ϕ | ROUND-OFF |
| 1 | X | AT LEAST ONE BIT IS "1" | | | ROUND-UP |

FIG. 4d
RZ (ROUND TOWARD ZERO) MODE

| SIGN BIT | LSB | GUARD BIT | ROUND BIT | STICKY BIT | ROUNDING |
|---|---|---|---|---|---|
| X | X | X | X | X | ROUND-OFF |

X: ϕ OR 1 (DON'T CARE)

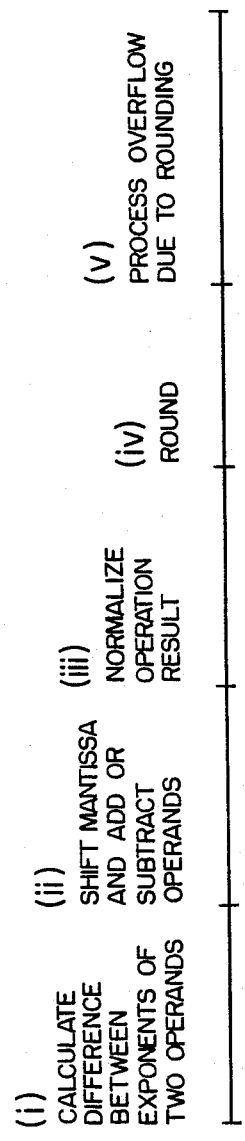
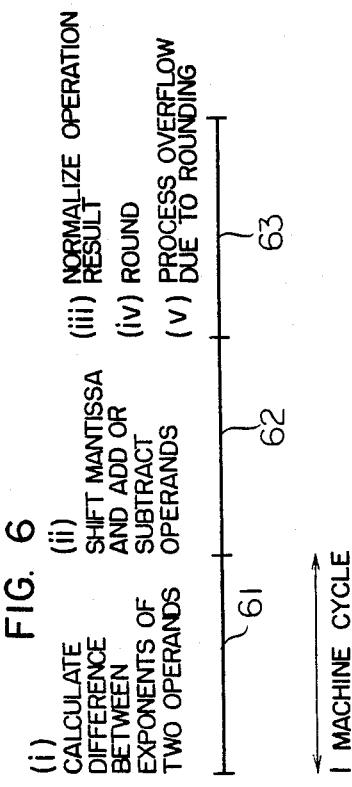
FIG. 5 PRIOR ART
FIG. 6
1 MACHINE CYCLE

TO FIG. 10

FIG. 16a
FLOATING POINT OPERATION $$a : 1.11 \cdots 1 \quad \times \quad 2^{224} \quad \times \quad (-1)^0$$

$$b : \underbrace{1.10 \cdots 0}_{\text{MANTISSA (24 BITS)}} \quad \times \quad 2^{200} \quad \times \quad (-1)^0$$

BIASED EXPONET  SIGN

+)

FIG. 16b
ADDITION AFTER SHIFT

```
 a : 1.11 ······ 1 1 0 0 0
+) b : 0 0 0 ······ 0 0 1 1 0
     ─────────────────────────
         1.11 ······ 1 1 1 1 0
         └────┬────┘ │ │ └→ STICKY BIT
            24 BIT   │ └→ ROUND BIT
                     └→ GUARD BIT
```

FIG. 16c
OVERFLOW DUE TO ROUNDING

```
    1.11 ······ 1 1 1 1 0
    0.00        0 0 0 0 0
+)              1              (ROUND-UP)
   ─────────────────────────
   10.00 ······ 0 0 1 1 0
   └─────┬─────┘
       24 BIT
```

FIG. 16d
SHIFT RIGHT BY 1 BIT $$\underbrace{1.00 \cdots 00}_{24\ \text{BIT}}$$

APPARATUS FOR PERFORMING FLOATING POINT ARITHMETIC OPERATIONS AND ROUNDING THE RESULT THEREOF

BACKGROUND OF THE INVENTION

The present invention relates to a floating point arithmetic operation unit, and more particularly to a floating point arithmetic operation unit suitable for performing a round operation at a high speed.

A method for rounding a result of the floating point arithmetic operation is disclosed in U.S. Pat. No. 4,468,748. In order to round a normalized mantissa operation result (64 bits) to a single precision (24-bit mantissa) or a double precision (56-bit mantissa), guard bits (8 bits used to determine the round processing) following the least significant bit (LSB) of the mantissa in the single or double precision are checked to determine whether to round up (add one to the LSB) or round off. If a round off operation is determined, the mantissa in the single or double precision of the mantissa operation result (64 bits), is added to zero, and for the other lower portion, and AND function is performed with zero. When it is determined that the mantissa should be rounded up, a carry input applied to the LSB of a 64-bit mantissa operation unit is propagated in portion to an addition with zero (actually it means an AND function) is carried out, and added to the desired mantissa LSB.

In this method, the determination and operation of the rounding processes is simultaneously performed (actually, the carry input to the LSB is handled depending on round-up or round-off) by utilizing the fact that the carry is propagated when the AND function is performed in a 4-bit sliced operation unit. However, it is necessary to control the 64-bit operation unit by dividing it into three portions, high order 24 bits, low order 8 bits and middle order 32 bits. Further, in this method, the rounding processing in an IEEE standard double precision floating point format as shown in FIG. 1b cannot be performed well because a 53-bit mantissa data including one hidden bit of an integer portion is handled in the operation and the LSB appears to the MSB in the 4-bit sliced operation unit. As can be seen in FIG. 16, the IEEE standard double precision floating point format includes a fraction (f) in bits 0–51, an exponent (e) in bits 52–62 and a sign (s) in bit 63. Leading bit (1) is in bit 0. If the round-up operation is performed for the mantissa which has a maximum value before the rounding process, some time after the rounding process is performed an overflow of the mantissa occurs due to the rounding processing.

The IEEE standard format is described in COMPUTER March, 1981, pages 51–62.

The above referenced description includes Draft 8.0 of IEEE Task P754, where it is recommended to carry out the floating point arithmetic operation in an expanded precision floating point format shown in FIG. 1c. For the round processing, it is recommended to check three bits following the LSB, that is, guard bit, round bit and sticky bit (which is a logical OR function of all bits following the third bit from the LSB), and the LSB and a sign bit as shown in FIG. 3 and carry out the rounding processing in accordance with rules shown in FIGS. 4a–4d according to one of four round modes (RN, RP, RM and RZ) shown in FIGS. 4a–4d which a user can specify and to designated one of three precisions shown in FIGS. 1a–1c.

FIG. 2 shows a processing flow of a conventional floating point add/subtract operation in accordance with the IEEE standard. A difference between exponents of two operands is calculated (10), and a mantissa of an operand having a smaller exponent is shifted to the LSB (to the right) by the difference between the exponents, and the operands are added or subtracted (20). In the shift operation, a logical OR function of all bits shifted beyond the round bit should be reflected to the sticky bit. This bit indicates whether a value overflowed to the right by the shift is zero or not. The operation result in the step 20 is shifted to the left by the number of zero bits preceding to the MSB, and this number is subtracted from the exponent (30). The result in the step 30 is rounded (40). Finally, whether the characteristic overflowed or not by the round processing is checked, and if it overflows, the mantissa is shifted to the right by one bit, and one is added to the exponent (50).

SUMMARY OF THE INVENTION

It is an object of the present invention to provide a floating point arithmetic operation unit which can rapidly perform round processing in a floating point arithmetic operation in accordance with the IEEE recommendation.

It is another object of the present invention to provide a floating point arithmetic operation unit which can perform round processing in accordance with the IEEE recommendation in one step.

It is other object of the present invention to eliminate an overflow step due to round processing.

In accordance with the present invention, a difference between exponents of two operands is calculated, a mantissa of the operand having a smaller exponent is shifted to the right by the difference between the exponents and the operands are added or subtracted. The result is shifted to the left by the number of zero bits preceding to the MSB, and it is added to zero. In the shifted result characteristic bits necessary to determine a round mode and a round precision are checked and a rounding process in accordance with a round mode specified by a user is determined. If a carry operation is to be performed in the rounding process, a carry generator is operated such that "1" is added to the LSB corresponding to the round precision specified by the user, and all bits following the LSB are set to "0". When the bits for the rounding processing are checked, whether a mantissa overflow will occur by the rounding process or not, that is, whether the mantissa is a maximum value in the specified precision is checked. If the mantissa is the maximum value and the carry operation is to be performed in the rounding process, the mantissa overflow is detected and it is informed to the exponent, and the mantissa operation result produces a minimum value one (1.0). In this manner, the round processing is speeded up.

BRIEF DESCRIPTION OF THE DRAWINGS

FIGS. 4a–4d show rounding rules recommended by the IEEE standard, FIG. 5 shows a time chart of a prior art floating point operation execution process, FIG. 6 shows a time chart of a floating point operation execution process in accordance with the present invention, FIGS. 16a–16d show examples of floating point operation.

DESCRIPTION OF THE PREFERRED EMBODIMENTS

Figure 1A:
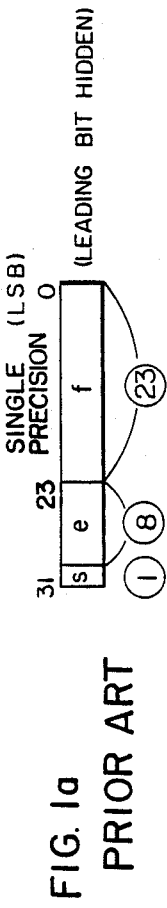
FIGS. 1a–1c show IEEE standard floating point formats.
Figure 1B:
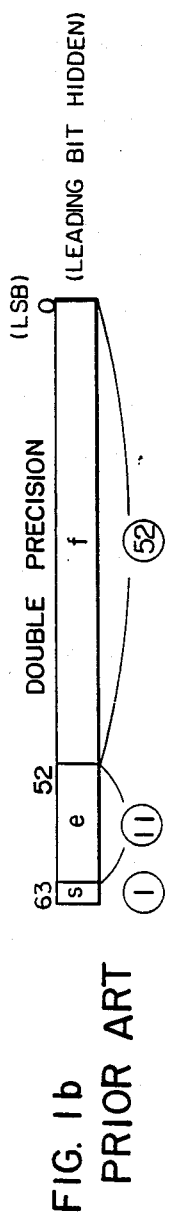
Figure 1C:
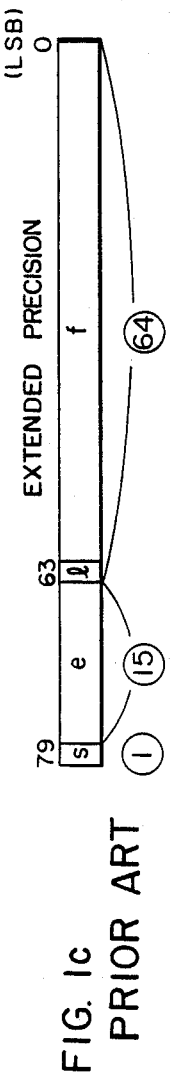
Figure 2:
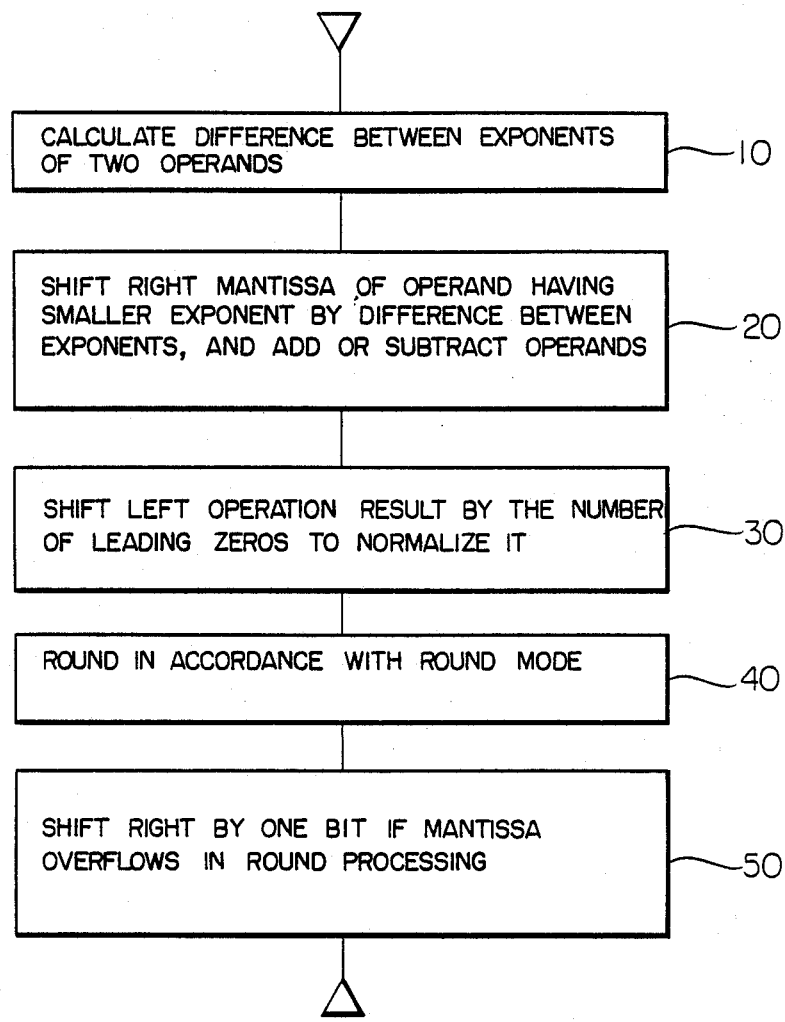
FIG. 2 shows a floating point operation flow chart in accordance with the IEEE standard.
Figure 3:
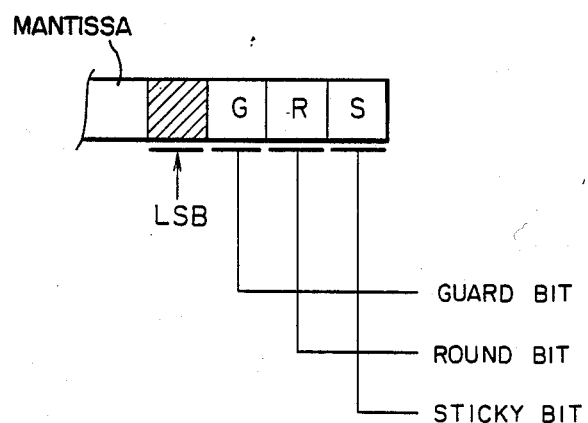
FIG. 3 shows guard, round and sticky bits used in round processing.
Figure 7:
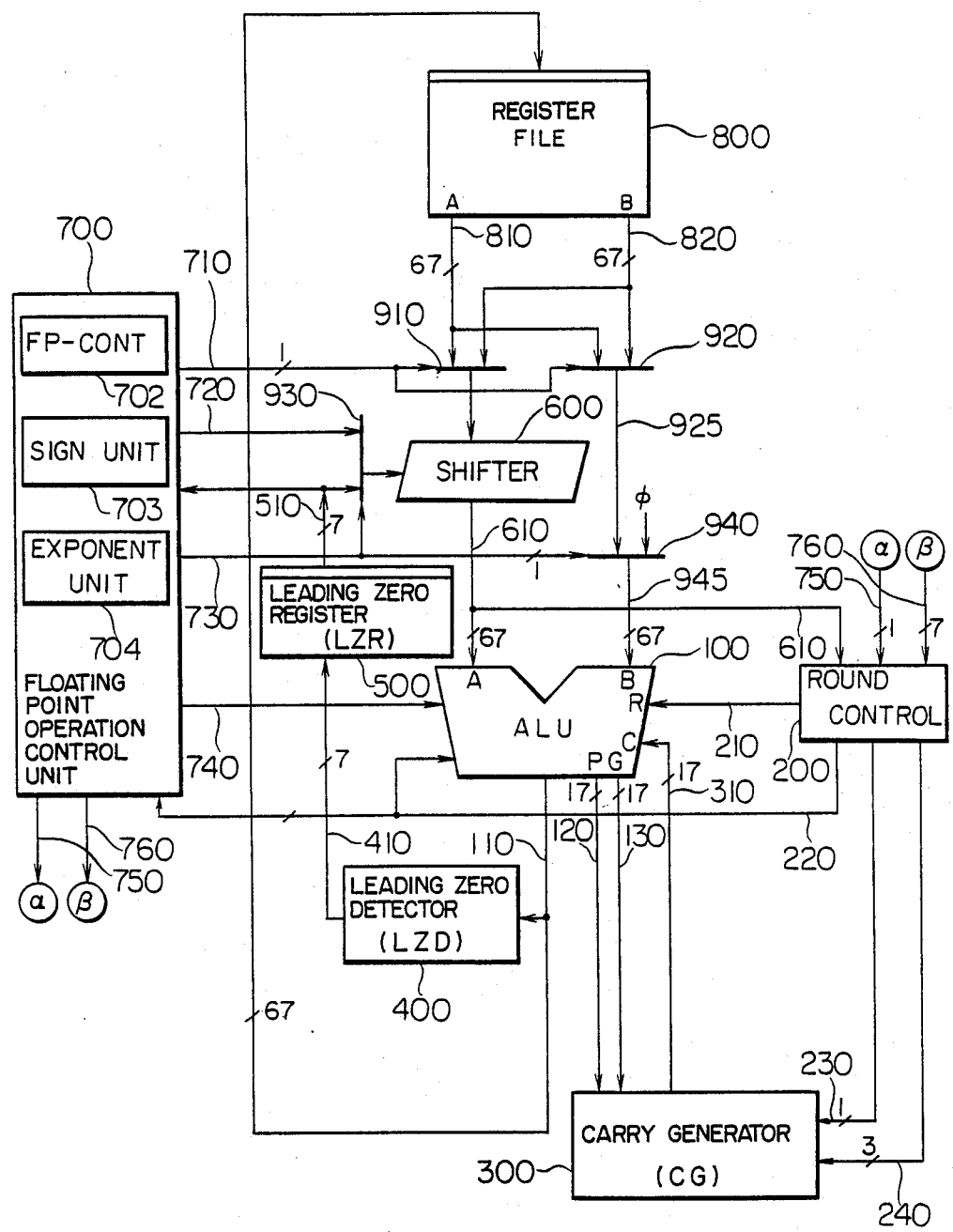
FIG. 7 shows a block diagram of an overall configuration of a floating point arithmetic operation unit in accordance with the present invention.

FIG. 7 shows an overall configuration of a floating point arithmetic operation unit in accordance with the present invention. The unit comprises a two-port register file (67-bit words) having ports A and B and a number of word registers, a shifter 600 for sifting bits left or right 67 bits at a time, a 67-bit width arithmetic operation unit (ALU) 100 for performing arithmetic and logic operations to two operands, a carry generator (CG) 300 for generating a carry propagation (P) 120 and a carry generation (G) 130 for every four bits from the ALU 100 and a carry (C) for every four bits to the ALU 100 in accordance with carry inputs 230 and 240 to an LSB, a round control unit 200 for determining round processing, that is, selecting round-up or round-off in accordance with an A input data of the ALU 100, designated round mode and round precision, a leading zero detection circuit 400 for detecting the number of "0" bits preceding an MSB of an operation result in the ALU 100, a leading zero register 500 for latching an output from the leading zero detection circuit 400, a floating point operation control unit 700 including a controller (FP-CONT) 702 for controlling the overall arithmetic operation unit, a sign operation unit (SIGN UNIT) 703 and an exponent operation unit (EXP UNIT) 704, and 2-to-1 selectors 910, 920, 930 and 940.

Figure 8:
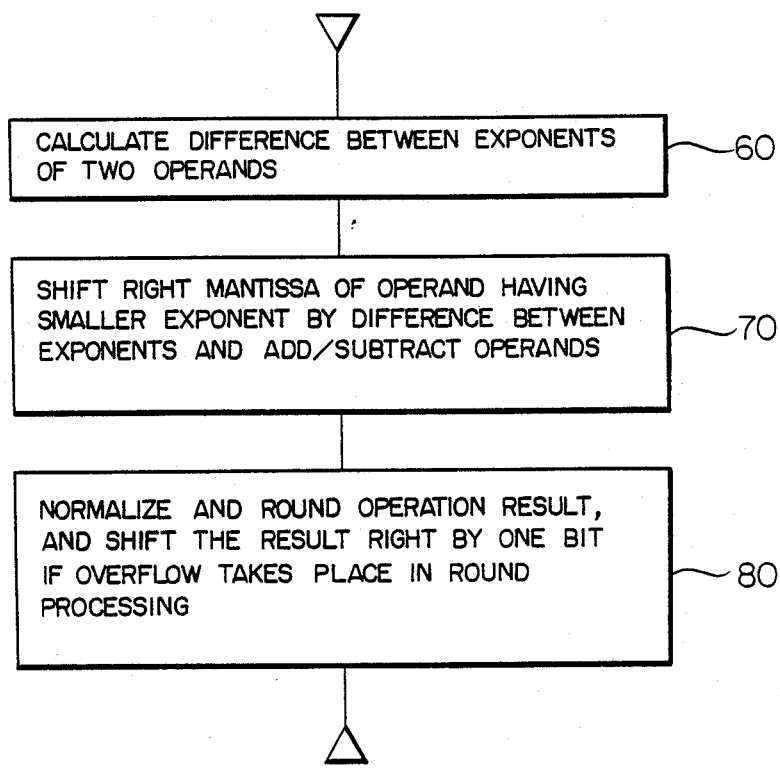
FIG. 8 shows a flow chart of a floating point add-/subtract operation by the unit shown in FIG. 7.

The floating point add/subtract operation of the present unit is now explained with reference to FIGS. 6, 7 and 8.

In a first machine cycle 61 of a computer shown in FIG. 6, a difference between exponents of two operands is calculated by the exponent operation unit 700 (step 60). For example, in an addition of two numerals a and b shown in FIG. 16a, the difference between the exponents is 224−200=24. Depending on the result, a select signal 710 is supplied from the floating point operation control unit 700 to the selectors 910 and 920 so that a mantissa data of one of a data 810 read from the port A of the register file 800 and a data 820 read from the port B having a smaller exponent is supplied to the shifter 600. Also, a select signal 730 is supplied to the selectors 930 and 940 so that a shift signal 720 is supplied to the shifter 600 and an output 925 is selected by the selector 920 as a B input data of the ALU 100. In the present example the exponent of b is shifted right by 24 bits to produce b', as shown in FIG. 16a.

In a next machine cycle 62, an output 610 of the shifter 600 and an output 945 of the selector 940 are operated on by the ALU 100 as shown in FIG. 16b (step 70) in accordance with a signal 740 which indicates addition or subtraction determined by operation results of the sign operation unit 703 and the exponent operation unit 704 in the operation control unit 700 and an instruction. The mantissa of the data having the smaller exponent is shifted right by the shifter 600 by the signal 720 which indicates the difference between the exponents and it is supplied to the input port A of the ALU 100. An operation result 110 of the ALU 100 is stored in the register file 800, and a length of the zero bits preceding to the MSB is detected by the preceding zero detector 400 and the length 410 is set in the leading zero register 500.

Figure 9:
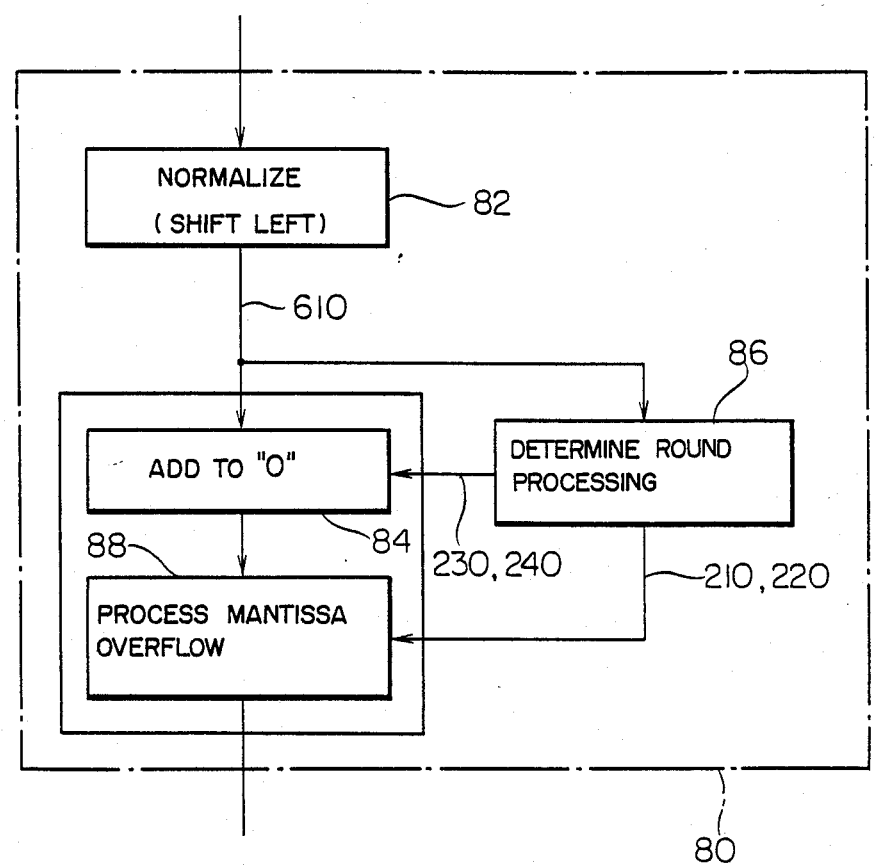
FIG. 9 shows a detailed flow chart of a portion of the flow chart shown in FIG. 8.

In the last or third machine cycle 63, the operation result in the step 82 of FIG. 9 is normalized by the shifter 600 in accordance with the content of the leading zero register 500. In the present example, a normalized value a+b' is produced by chance. It is added in the ALU 100 to "0" supplied from the selector 940, and the sum is rounded as shown in FIG. 16c (steps 84, 86). To this end, a select signal 710 is produced so that the operation result read from the register file 800 is selected by the selector 910 and supplied to the shifter 600. The output 510 of the leading zero register 500 is selected as a shift signal to the shifter 600 and the floating point operation control unit (FP CONT) 700 supplies a select signal 730 to the selectors 930 and 940 so that "0" is supplied as the B input to the ALU 100. In order to carry out the rounding process, the operation control unit 700 supplies the signal 740 indicating the addition to the ALU 100, and a signal 750 indicating the round processing and a signal 760 indicating the round mode and the round precision to the round control unit 200. The round control unit 200 checks the round bits of the operand to be rounded to determine the round processing in accordance with the signals 750 and 760. It supplies a round carry signal 230 and a round precision signal 240 to the carry generator 300, and supplies a round precision signal 210 to the ALU 100. The round control unit 200 also checks whether a mantissa overflow occurs by the rounding process and informs the result to the ALU 100 and the exponent operation unit 700 through the signal line 220. In the example of FIG. 16c, the integer portion is 10 and the overflow occurs. The carry generator 300 generates a carry output 310 for every four bits of the ALU 100 in accordance with the carry propagate signal (P) and carry generate signal (G) 130 generated for every four bits from the ALU 100 and the signals 230 and 240. If the signal line 230 indicates the carry, the carry to the LSB at the precision indicated by the signal line 240 takes place and the operation result 110 in the ALU 100 is rounded up. If the signal line 230 does not indicate the carry, the carry to the LSB does not take place and the operation result 110 in the ALU 100 is rounded off. The operation result with the overflow is shifted right by one bit as shown in FIG. 16d and the exponent thereof is incremented by one (step 88).

Figure 10:
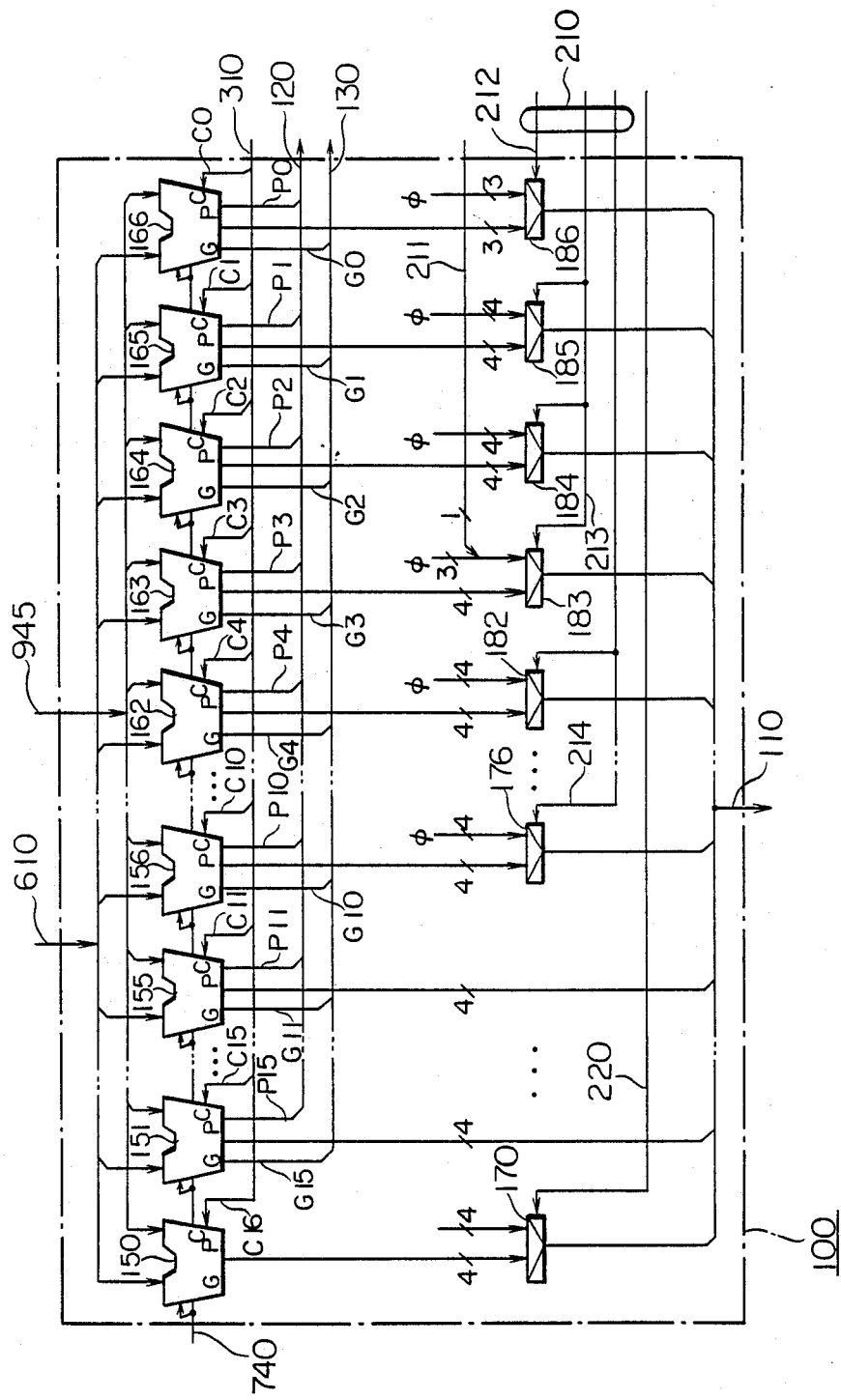
FIG. 10 shows a block diagram of an ALU 100 shown in FIG. 7.

A detail of the ALU 100 is now explained with reference to FIG. 10, which shows a 67-bit (16×4+3) width operation unit. The ALU 100 comprises 4-bit width ALU's 150–165, a 3-bit width ALU 166 and 2-to-1 selectors 170 and 176–186. The ALU's 150–165 may be Texas Instruments IC 74181. Each of the 4-bit width ALU's supplies a carry lookahead carry propagate signal 120 (P0–P15) and a carry generate signal 130 (G0–G15) to the carry generator 300. The carry generator 300 sends back carry signals 310 to the 4-bit- ALU's 150–166. The selector 186 selects the "0" input by the signal line 212 from the round control unit 200 to select one of three round precisions. The selectors 183–185 select the "0" inputs for masking the low order bits of the data by the signal line 213 from the round control unit 200 when the single precision or double precision is selected. For the double precision rounding process, the LSB 211 is produced by the round control unit 200 so that a correct LSB is produced even when the selector 183 selects the "0" input, because the MSB of the output from the ALU 163 to the selector 183 is at the position of the LSB in the double precision. For the single precision rounding process, the selectors 176–182 select the "0" inputs by the signal line 214 from the round control unit 200. If the mantissa overflow takes place in one of the three round precisions, the selector 170 selects $(8)_{16}=(1000)_2$ by the signal line 215 from the round control unit 200 and the mantissa with the overflow is shifted right by one bit. (Suffixes 16 and 2 represent hexadecimal number and binary number, respectively.) Since the outputs of the 4-bit ALU's $151 \propto 155$ are common to all precisions, no selector is used. The signal 210 from the round control unit 200 is not outputted and the selectors 170 and 176–186 always select the outputs from the ALU's.

Figure 11:
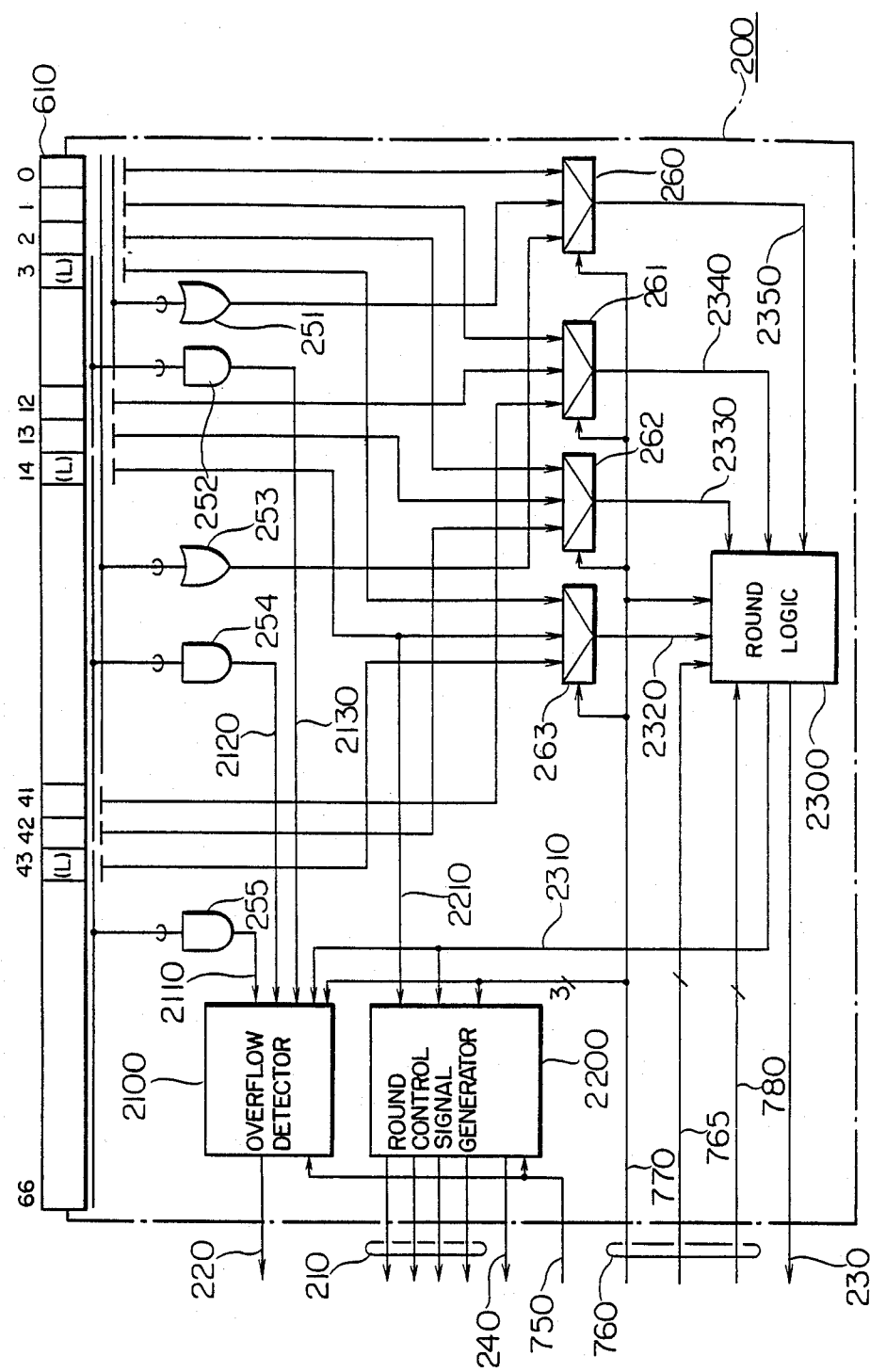
FIG. 11 shows a block diagram of a round control unit 200 shown in FIG. 7.

A detail of the round control unit 200 is explained with reference to FIG. 11. Symbols (L) at bits 3, 14 and 43 of the 67-bit data 610 supplied from the shifter indicate bit 0 positions or LSB in the respective precisions. The round control unit 200 comprises AND gates 252, 254 and 255, OR gates 251 and 253, 3-to-1 selectors 260–263, a round processing decision logic 2300, a mantissa overflow detector 2100 and a round processing signal generator 2200 for generating a signal indicating the round precision to the ALU 100 and the carry generator 300. The selector 260 selects, by the signal 770 indicating the round precision, a sticky bit for each precision, that is, a logical OR function of the bit 0 for the extended precision, the bits 11–0 for the double precision, which are produced by the OR gate 251, and a logical OR function of the bits 40–0 for the single precision, which is produced by the OR gate 253. The selector 261 selects the round bit for the round precision by the signal line 770, the selector 262 selects the guard bit and the selector 263 selects the LSB.

The round processing decision logic 2300 determines the round processing in accordance with the outputs 2350, 2340, 2330 and 2320 of the selectors 260–263, the sign 765 of the mantissa 610 to be rounded, the round precision 770 and the round mode 780, and generates the carry signals 230 and 2310.

Figure 12:
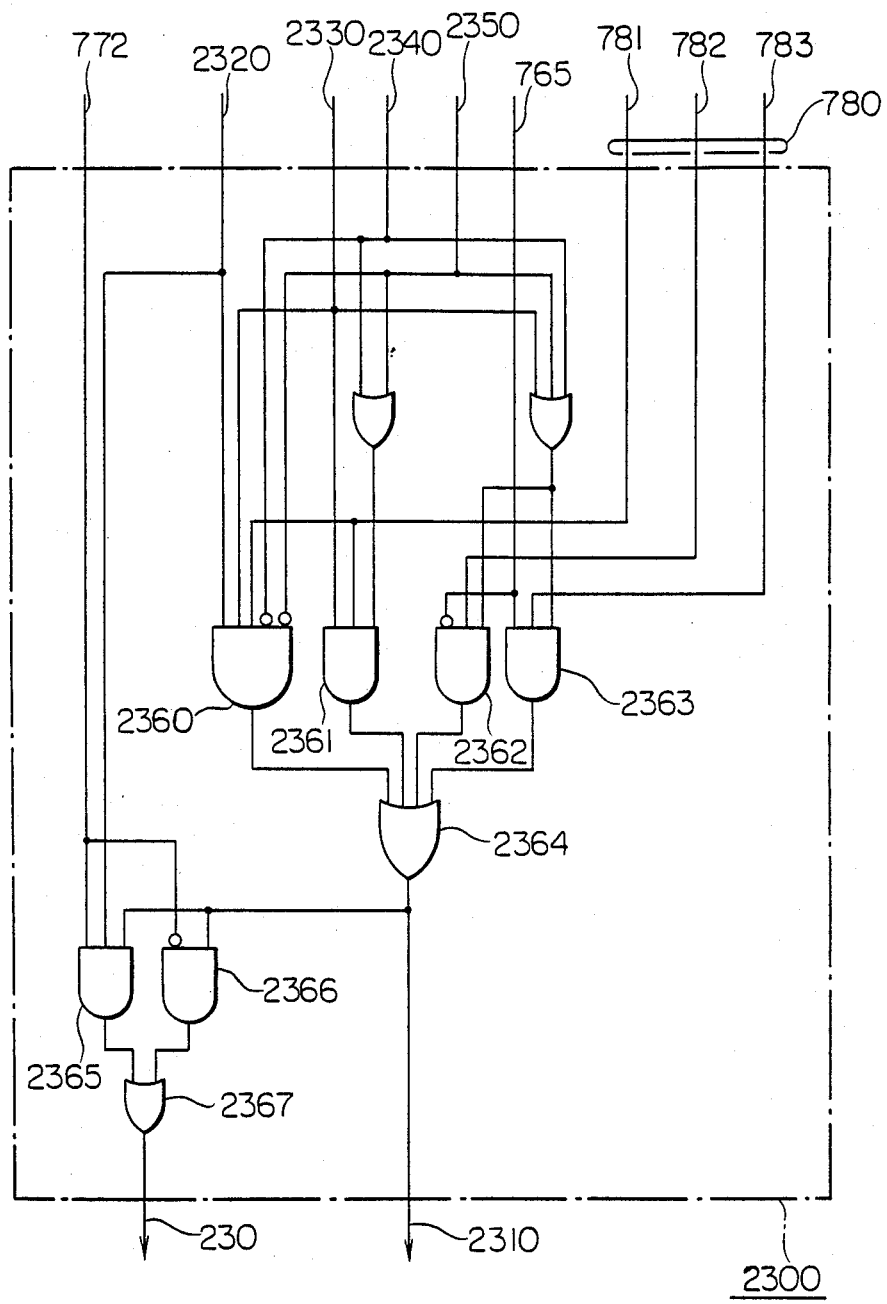
FIG. 12 shows a circuit diagram of a round processing decision logic 2300 shown in FIG. 11.

FIG. 12 shows a configuration of the round processing decision logic 2300. AND gates 2360–2363 determines round-up or round-off in the round processing in accordance with rules shown in FIGS. 4a–4d, and produces a signal 2310 through an OR gate 2364. An AND gate 2365 generates the carry signal 230 for the double precision round processing (informed by the signal line 772). In the double precision, the LSB is at the highest position of the 4-bit sliced ALU and hence the carry cannot be directly added to the LSB. Thus, the carry to the LSB is separately controlled and the carry to the next bit to the LSB is controlled by this circuit. That is, for the double precision round processing, the AND gate 2365 produces the carry signal 230 only when LSB=1 and the carry to the LSB is to take place. For the other two precision round processings, the signal 2310 from the AND gate 2366 is directly used as the signal 230.

The round processing control signal generator 2200 for the ALU 100 and the carry generator 300 generates the signals 210 and 240 in accordance with the carry signal 2310 from the round processing decision logic 2300, the round precision 770, the LSB 2210 in the double precision and the round signal 750 from the FP-CONT 700.

Figure 13:
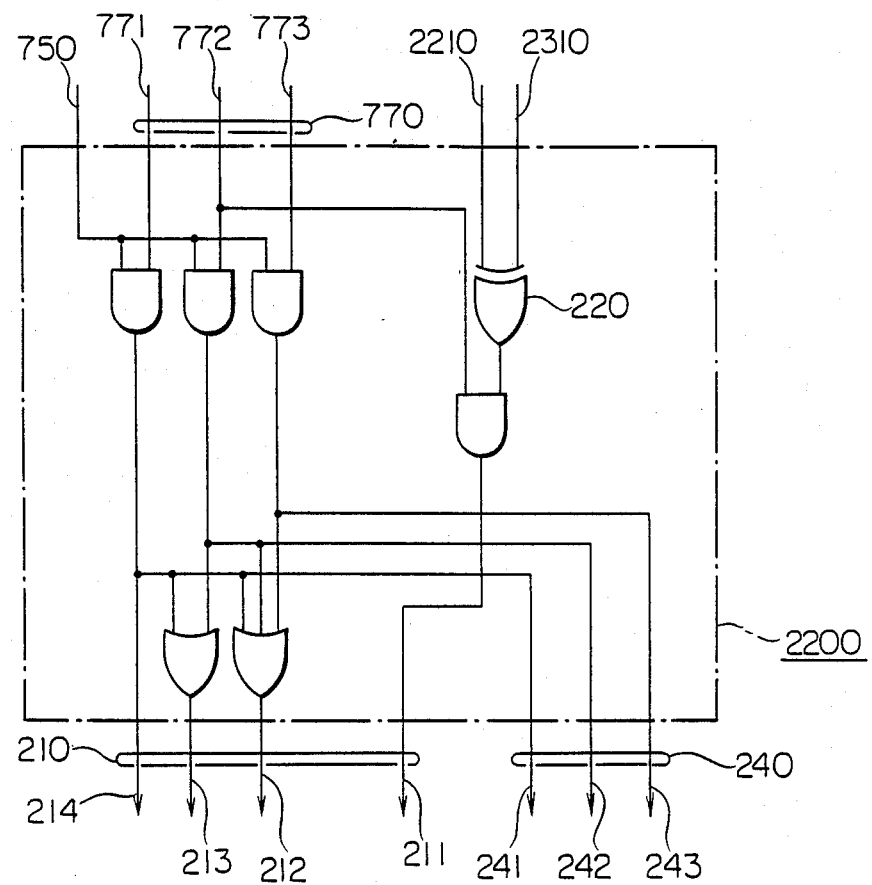
FIG. 13 shows a circuit diagram of a round control signal generation circuit 2200 shown in FIG. 11.

FIG. 13 shows a configuration of the round processing control signal generator 2200. Single precision signal 771, double precision signal 772 and extended precision signal 773 are ANDed with a signal 750 and one of the select signals 212–214 to the selectors 170, 176–186 of the ALU 100 and one of round precision signals 241–243 to the carry generator 300 are produced. For the double precision signal 772, the LSB is produced in the double precision. An exclusive OR function of the LSB 2210, in the double precision, of the number 610 to be rounded and the carry signal 2310 from the round processing decision logic 2300 is produced by the EOR gate on the signal line 211. In other cases, "0" is produced.

The mantissa overflow detector 2100 produces the signal 220 to indicating whether the mantissa overflows or not in accordance with the signal 2110 from the AND gate 255 which ANDs the bits 66–43 of the number on line 610 to be rounded, the signal 2120 from the AND gate 254 which ANDs the bits 42–14, the signal 2130 of the AND gate 252 which ANDs the bits 13–3, the carry signal 2310 from the round processing decision logic 2300, the round precision 770 and the round signal 750.

Figure 14:
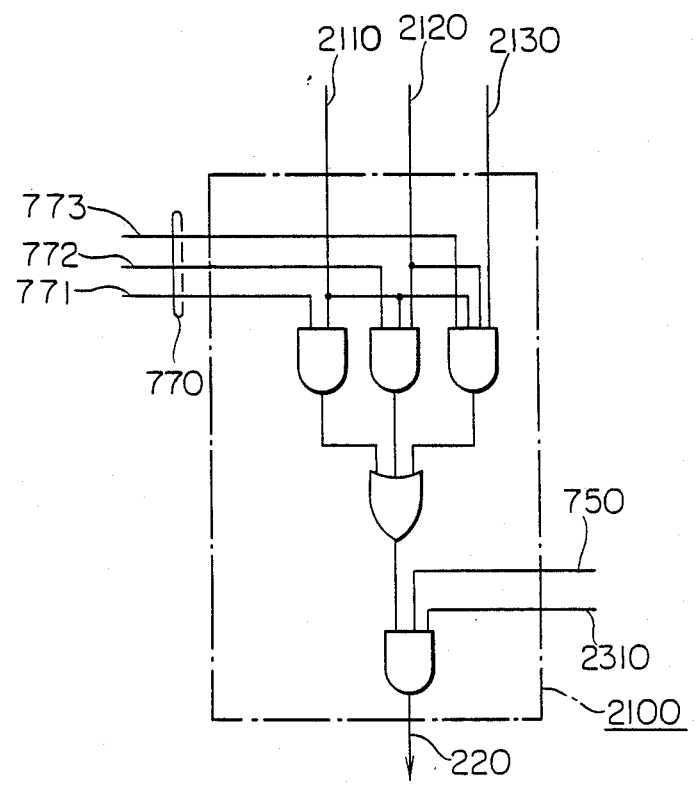
FIG. 14 shows a circuit diagram of a mantissa overflow detection circuit 2100 shown in FIG. 11.

FIG. 14 shows a configuration of the mantissa overflow detector 2100. When the signal 771 is true to indicate the single precision round processing, the overflow may take place if the signal 2110 is true. When the signal 772 is true to indicate the double precision round processing, the overflow may take place if the signals 2110 and 2120 are true. When the signal 773 is true to indicate the extended precision round processing, the overflow may take place if all of the signals 2110, 2120 and 2130 are true. If the signal 750 indicates the round processing and the carry signal 2310 from the round processing decision logic 2300 indicates the carry, it is considered that the mantissa overflow takes place due to the round processing and the signal 220 is rendered true.

The carry generator 300 generates the carry output 310 (C16—C0) to the ALU 100 in accordance with the carry propagate signal 120 (P15—P0) from the ALU 100, the carry generate signal 130 (G15—G0), the carry signal 230 from the round processing decision logic 200 and the round precision 240. The configuration of the carry generator 300 for other than the round processing is well-known as a carry look-ahead circuit and hence it is not explained here. Only the portion relating to the round processing is described.

Figure 15:
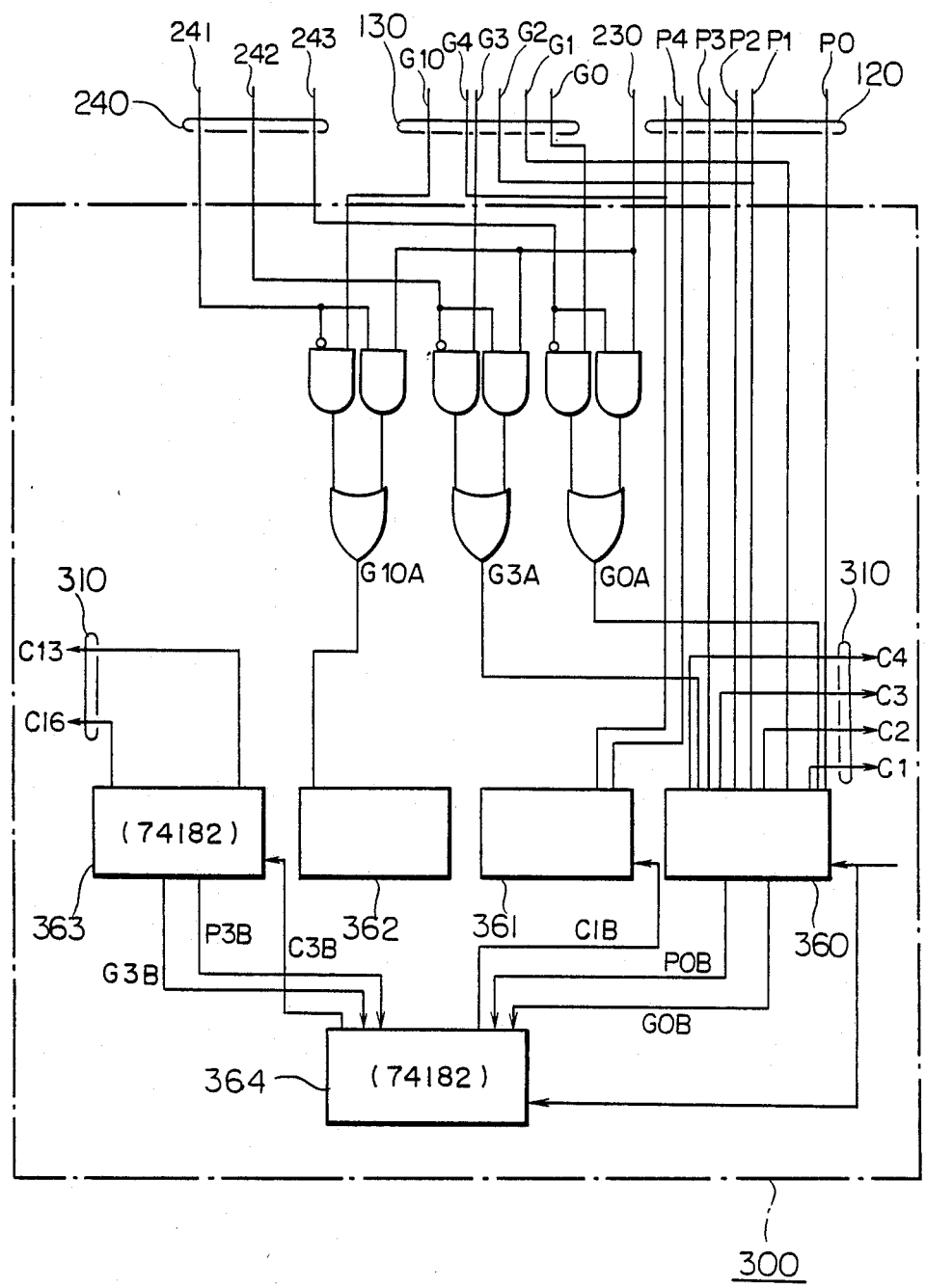
FIG. 15 shows a circuit diagram of a portion of a carry generation circuit 300 shown in FIG. 7 which relates to the round processing.

FIG. 15 shows a configuration of the portion of the carry generator 300 which relates to the round processing.

If none of the round precision signals 240 is true, the carry generate signals G0, G3 and G10 from the ALU 100 are supplied to the ALU 100 as the carry outputs through carry look-ahead circuits 360–364. If the round precision signal 240 indicates the round processing in one of the round precisions, that is, if the single precision is indicated (the signal 241 is true), the carry generate signal G0A is supplied to the carry look-ahead circuits 360–364, if the double precision is indicated (the signal 242 is true), the carry generate signal G3A is supplied, and if the extended precision is indicated (the signal 243 is true), the carry generate signal G10A is supplied. The carry is looked ahead based on this signal and necessary carry outputs C1–C16 are generated. In this manner, the round processing in the desired precision is attained.

In the present embodiment, only the round processing of the mantissa has been described. For the round processing of the exponent, the exponents with and without addition of "1" are prepared and one of the two exponents is selected by the mantissa overflow signal 220 from the round processing control unit 200. Thus, the discrimination of the mantissa overflow is not necessary and the high speed round processing is attained.

We claim:

1. A floating point arithmetic operation apparatus comprising:
   a floating point operation control unit for controlling the operation of said floating point arithmetic operation apparatus;
   an operation unit for performing a floating point arithmetic operation on data provided to said floating point arithmetic operation apparatus;
   a carry generator for generating a carry output in accordance with a carry propagate signal and a carry generate signal from said operation unit, and supplying the carry output to said operation unit;
   a shifter for shifting an operand and supplying the shifted operand to said operation unit; and
   a round control unit for rounding an operation result of said operation unit into a selected round precision of either single precision, double precision or extended precision in accordance with the shifted operand output from said shifter wherein said round control unit includes mantissa overflow detection means for detecting whether a mantissa overflow will take place due to the rounding process, said mantissa overflow detection means supplies a mantissa overflow signal to said floating point operation control unit and said operation unit causing said operation unit to produce a value of one as a result of an arithmetic operation on the mantissa;
   said floating point operation control unit includes an exponent unit which responds to said mantissa overflow signal and provides one or two prepared exponent values as an output.

2. A floating point arithmetic operation apparatus according to claim 1 wherein said operation unit includes mask means for rendering low order bits of a rounded result to "0" in accordance with a round precision, and means for obtaining a least significant bit from a correctly rounded result generated by rounding an operation result to an double precision data and supplying said least significant bit to a least significant bit (LSB) corresponding to an double precision floating point data.

3. A floating point arithmetic operation according to claim 1, wherein said two exponent values are obtained with and without addition of one to an exponent value at the time of said round processing.

4. A floating point arithmetic operation apparatus according to claim 3 wherein said round control unit includes a logic circuit which receives the shifted operand from said shifter and produces a round control signal and a carry signal.

5. A floating point arithmetic operation apparatus according to claim 4 wherein said logic circuit includes means for extracting round processing bits from the output data of said shifter and determining a type of rounding process to be performed in accordance with a round mode data and round precision data,
   means for generating the carry signal output to the least significant bit in accordance with a selected single precision or extended precision when round processing is required, and means for generating a carry signal output to a bit to the left of a least significant bit corresponding to an IEEE standard double precision floating point data in rounding to double precision.

6. A floating point arithmetic operation apparatus comprising:
   a register file for storing operands and an operation result therefor;
   a shifter for shifting the operand read from said register file left or right by any number of bits;
   an operation unit for operating on an operand read from said register file and the shifter output;
   a carry generator for generating a carry output to said operation unit in accordance with a carry propagate signal and a carry generate signal from said operation unit;
   a leading zero bit detector for detecting a length of leading zeros in the operation result of said operation unit;
   a floating point operation control unit having a sign operation unit and an exponent operation unit wherein said floating point operation control unit controls the floating point arithmetic operation apparatus; and
   a round control unit for rounding an operation result in a selected round precision of either single precession, double precision or extended precision including round processing control signal generation means for extracting round processing bits from the output data of said shifter, determining a type of round processing to be performed in accordance with round mode data and round precision data and supplying a carry signal to said carry generator when required for said round processing, and mantissa overflow detection means for detecting whether a mantissa will overflow at data bits thereof due to said round processing based on output from round processing control signal generation means and supplying a mantissa overflow signal, wherein said round control unit provides said mantissa overflow signal to said floating point operation control unit and said operation unit;
   said carry generator generating a carry output at predetermined positions in accordance with the carry signal from said round control unit and supplying the carry output to said operation unit.

7. A floating point arithmetic operation apparatus according to claim 6 wherein said round processing control signal generation means supplies to said operation unit a control signal to render zero that portion of the output of said operation unit which becomes unnecessary by the round processing performed.

8. A floating point arithmetic operation apparatus according to claim 6 wherein said operation unit produces a signal representing one for the mantissa when said round control unit generates the mantissa overflow signal.

9. A floating point arithmetic operation apparatus comprising:
   an operation unit for performing a floating point operation;
   a round control unit for rounding an operation result in a selected round precision of either single precision, double precision or extended precision;
   mantissa overflow detection means for generating a mantissa overflow signal indicating an occurrence of a mantissa overflow condition when a mantissa being applied to said operation unit for round processing has a maximum value in the selected round precision and when the round processing is set to round up a mantissa; and
   an exponent unit responding to said mantissa overflow signal for providing one exponent value selected from two exponent values previously obtained by addition of "1" to one of the two exponent values at the time of said round processing.

10. A floating point arithmetic operation apparatus comprising:
   an operation unit for performing a floating point operation;
   a round control unit for rounding an operation result in a selected round precision of either single precision, double precision or extended precision;
   mantissa overflow detection means for generating a mantissa overflow signal indicating an occurrence of a mantissa overflow condition when a mantissa being applied to said operation unit for round processing has a maximum value in the selected round precision and when the round processing is set to round up a mantissa;
   an exponent unit responding to said mantissa overflow signal for providing one exponent value selected from two exponent values previously obtained by addition of "1" to one of the two exponent values at the time of said round processing; and
   wherein said mantissa overflow detection means includes a circuit for ANDing round processing bits from a least significant bit to a most significant bit of the mantissa to be rounded arranged in the selected round precision, and a signal indicating a round-up, said circuit for ANDing providing said mantissa overflow signal.

* * * * *